O. A. MYGATT.
PRESSED GLASS STRUCTURE.
APPLICATION FILED JUNE 15, 1909.

1,093,350.

Patented Apr. 14, 1914.

Witnesses:

Inventor:
Otis A. Mygatt,
by: His Attorney.

UNITED STATES PATENT OFFICE.

OTIS A. MYGATT, OF NEW YORK, N. Y.

PRESSED GLASS STRUCTURE.

1,093,350.  Specification of Letters Patent.  Patented Apr. 14, 1914.

Application filed June 15, 1909. Serial No. 502,378.

*To all whom it may concern:*

Be it known that I, OTIS A. MYGATT, a citizen of the United States, residing at New York, in the county of New York and State of New York, have invented certain new and useful Improvements in Pressed Glass Structures, of which the following is a specification, reference being had therein to the accompanying drawings.

The object of my invention is to combine the advantages of the useful qualities of silvered glass with the sparkle and brilliancy of glass having protuberances upon its surfaces.

My invention is particularly applicable to reflectors for artificial light.

At present there are numerous forms of silvered blown glass reflectors with smooth and corrugated surfaces, but these cannot be made to give rich, sparkling effects, because in blown glass, both surfaces follow the same outline. In order to get the sparkling effects which are the object of this invention, the two surfaces which face each other through the thickness of the glass must not conform in outline.

In my present invention I make use of transparent glass inclosures, having protuberances on both surfaces, and having a specular metallic coating on one of the surfaces. Although the protuberances may have various forms, I prefer that they shall take the form of corrugation or ribs, because these are more convenient to make. The protuberances, whatever their form, according to my invention, are so disposed that those on the opposite surfaces of the glass are out of line. If they are corrugations or ribs, they may be said to be out of parallel. All the light rays on the one side which enter the glass are refracted by the protuberances on that surface and are reflected back by the metallic coating on the opposite surface, passing through other refracting surfaces, so that the light rays emitted from the present protuberances must be twice refracted and twice reflected where the silvered surface has suitable protuberances.

Figure 1:
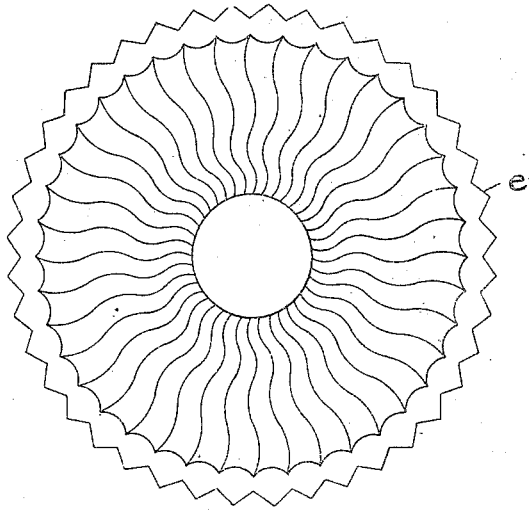
Figure 2:
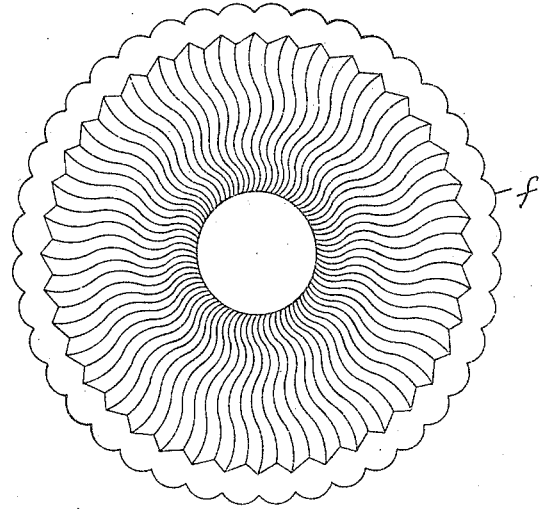

Figures 1 and 2 are plan views of reflectors embodying my invention.

Fig. 1 is a plan view of a modification showing the conventional double-reflecting prismatic reflector having a coating of silver or other specular backing applied at *e* and on the inner surface waved ribbings for the purpose set forth. Fig. 2 is a plan view of a further modification having ribs on the outer surface backed by the mirrored coating *f* and having prismatic ribs on the inner surface. The shape of the reflector may be that of a cone or an inverted bowl, or any known shape for reflectors for artificial lights. The lines of the ribs on the inner and outer surfaces are not parallel. When such a reflector is placed over or around an artificial light source, the rays from the source will pass first through the transparent pressed corrugations on the inner surface which are intended to refract them at different angles, and then after passing through the transparent body of the glass they will strike the specular metallic reflecting coating on the outer surface where they are reflected, and then strike other parts of the corrugations on the inner surface at different angles.

The disagreeable glare and streaks given by the modern high efficiency electric and other lamps are avoided when used with silvered reflectors made according to the invention described herein. This glare is avoided to a greater degree than is the case with ordinary glass reflectors having their outer surface silvered, even when such reflectors are of blown, corrugated glass, for the reason already stated that where the curves on the outer and inner surface conform to one another, there is practically very little diversion of the light rays from their directed course.

While I prefer to make glass articles embodying my invention by pressing, it is to be understood that I do not restrict myself to this mode of manufacture, since I may also make the said articles by molding, rolling or other well known method.

Having described my invention what I claim is:

A body of transparent glass backed on one side by a ribbed silvered coating and having opposite thereto ribbed light diffusing media, the ribbed surface of which is out of parallel with the ribbed silver-coated side.

In testimony whereof I affix my signature in presence of two witnesses.

OTIS A. MYGATT.

Witnesses:
 JOEL B. LEBERMAN,
 ERNERT P. RAY.